(12) United States Patent
Deville et al.

(10) Patent No.: US 9,689,534 B2
(45) Date of Patent: Jun. 27, 2017

(54) PIPELINE-WASTE-GAS REDUCTION METHOD

(71) Applicants: Chad Deville, Covington, LA (US); Wayne Deville, Alexandria, LA (US)

(72) Inventors: Chad Deville, Covington, LA (US); Wayne Deville, Alexandria, LA (US)

(*) Notice: Subject to any disclaimer, the term of this patent is extended or adjusted under 35 U.S.C. 154(b) by 0 days.

(21) Appl. No.: 14/938,373

(22) Filed: Nov. 11, 2015

(65) Prior Publication Data

US 2017/0130903 A1   May 11, 2017

(51) Int. Cl.
*F17D 5/02* (2006.01)
*G05D 16/20* (2006.01)

(52) U.S. Cl.
CPC ........... *F17D 5/02* (2013.01); *G05D 16/2086* (2013.01); *G05D 16/2093* (2013.01); *Y10T 137/777* (2015.04)

(58) Field of Classification Search
CPC .. G05D 7/0641; G05D 7/0647; G05D 7/0652; G05D 16/2086; G05D 16/2093; Y10T 137/7761; Y10T 137/7769; Y10T 137/777; F17D 5/02
USPC .................. 137/487.5, 492, 492.5
See application file for complete search history.

(56) References Cited

U.S. PATENT DOCUMENTS

| | | | |
|---|---|---|---|
| 2,736,337 A * | 2/1956 | Parks ................... | G05D 9/04 137/271 |
| 3,890,992 A * | 6/1975 | Wolz .................... | G05B 9/05 137/14 |
| 4,519,254 A * | 5/1985 | Sonderegger ........... | G01L 5/14 310/338 |
| 4,559,821 A * | 12/1985 | Engeler ................ | G01L 5/14 73/167 |
| 4,649,754 A * | 3/1987 | Zacharias ............. | G01F 1/662 310/334 |
| 4,679,438 A * | 7/1987 | Wareham .............. | G01L 9/045 29/454 |
| 4,735,091 A * | 4/1988 | Engeler ............... | F42B 35/00 73/706 |
| 4,819,487 A * | 4/1989 | Wareham .............. | G01L 9/045 338/4 |
| 4,982,608 A * | 1/1991 | Marki ................. | G01L 9/008 73/726 |
| 5,148,829 A * | 9/1992 | Deville .............. | G01F 1/42 137/486 |
| 5,329,819 A * | 7/1994 | Park ................. | G01L 9/0075 361/283.1 |
| 5,460,196 A * | 10/1995 | Yonnet ............... | G05D 16/2093 137/12 |
| 5,520,206 A * | 5/1996 | Deville .............. | G05D 16/0602 137/12 |
| 5,586,575 A * | 12/1996 | Bergamini ........... | F15B 13/0438 137/116.5 |

(Continued)

*Primary Examiner* — William McCalister
(74) *Attorney, Agent, or Firm* — Keaty Law Firm LLC (57) ABSTRACT

A pipeline-waste-gas reduction method to reduce the amount of gas wasted by existing high-pressure pipelines having existing pipeline controllers and existing actuator-based control valves, by reducing the pressure of gas sent to existing pipeline controllers by a determined factor, consequently reducing the amount of gas wasted by the controllers, and then increasing control pressure returned by the controllers by the same factor, ensuring that the proper control pressure is sent to the existing actuator-based control valves.

1 Claim, 8 Drawing Sheets

(56) References Cited

U.S. PATENT DOCUMENTS

| | | | | |
|---|---|---|---|---|
| 5,615,832 | A | * | 4/1997 | Price .................... B05B 7/1404 137/489.5 |
| 5,660,198 | A | * | 8/1997 | McClaran ............ G05D 16/106 137/10 |
| 5,706,852 | A | * | 1/1998 | Deville ................. F16K 27/044 137/486 |
| 5,758,686 | A | * | 6/1998 | Ohtsuka ................. G05D 7/005 137/488 |
| 5,931,186 | A | * | 8/1999 | Skoglund ............. G05D 7/0133 137/486 |
| 6,171,066 | B1 | * | 1/2001 | Irokawa .................... F15B 9/09 137/84 |
| 6,584,999 | B2 | * | 7/2003 | Inayama ............ G05D 16/2093 137/102 |
| 6,779,541 | B2 | * | 8/2004 | Inayama ............ G05D 16/2093 137/102 |
| 6,832,628 | B2 | * | 12/2004 | Thordarson .......... G05D 7/0106 137/488 |
| 7,766,030 | B2 | * | 8/2010 | Askew .................... F15B 5/006 137/485 |

\* cited by examiner

PIPELINE-WASTE-GAS REDUCTION METHOD

BACKGROUND OF THE INVENTION

This invention provides a pipeline-waste-gas reduction method to reduce the amount of gas wasted by existing high-pressure pipelines having existing pipeline controllers and existing actuator-based control valves.

High-pressure gas pipelines, which can be thought of as "natural gas" pipelines, must be regulated by control valves to allow, prevent, or partially allow flow of high-pressure gas in a given segment of the pipeline. Such regulation is achieved by existing equipment, specifically existing controllers which use a reduced, control-level pressure of the gas in the pipeline as a means of signaling whether a control valve should be closed or partially closed, and existing control valves which employ actuators driven by that same reduced, control-level pressure of the gas in the pipeline. The remote locations of many of the control valves, and the dangers of explosion or failure, influenced the development of the existing system, which uses a portion of the pressure of the gas in the pipeline as a source of motive force, rather than some outside source.

The existing pipeline controllers continuously vent all or some of the control-level gas pressure to the atmosphere for substantially all of the time. This venting is a waste of gas and is a source of pollution, because the gas is mostly methane.

According to a 2015 announcement by the Obama Administration, methane emissions accounted for nearly 10 percent of United States greenhouse gas emissions in 2012, of which nearly 30 percent came from the production, transmission, and distribution of oil and natural gas. The Administration announced a goal to cut methane emissions from the oil and gas sector by 40 to 45 percent from the 2012 levels by the 2025.

The existing gas-venting pipeline controllers and actuator-based control valves are already in place, are reliable, were expensive to procure and install, and would be expensive to replace. Therefore, there is a need for a waste-gas reduction method that can be used with the existing equipment, without negatively affecting the existing equipment's operation or reliability.

U.S. Pat. No. 6,173,735, issued Jan. 6, 2015 to Marney D. Perry, Jr. et al. for "Method and Apparatus for Regulating Gas Flow," discloses a pilot-operated, pressure-loaded, movable diaphragm-type gas-flow regulator valve, which is used in flow control applications. A regulator body internal port arrangement interconnects two independent throttling mechanisms in series. Two throttle plates are located within the regulator valve body relative to an inlet chamber and an outlet chamber. A movable diaphragm is positioned relative to a throttle plate by a separate pilot control system to vary the area of throttle plate exposed to flow, and, thus, the flow rate of the regulator valve. The throttle plates each have drilled flow apertures, which control flow through the valve. Smaller flow apertures are opened before larger flow apertures as the valve diaphragm lifts, thereby ensuring stability at low-flow conditions, while providing high capacity at maximum diaphragm lift. The configuration of the throttle plates, the inlet chamber, and the outlet chamber substantially reduces operational noise of the gas-flow regulator by minimizing turbulent flow within the regulator valve body.

U.S. Pat. No. 4,921,399, issued May 1, 1990 to Lawrence E. Lew for "Gas Pipeline Temperature Control," discloses a compressor station for boosting the pressure of gas stream being transported in a pipeline wherein the act of recompressing the gas stream to a desired pressure results in a gas temperature sufficiently high to stimulate cracking activity in the pipeline when the compressed stream gas is re-injected into the pipeline. A method and apparatus are disclosed for cooling a portion of the warm compressed gas to form a cool gas stream and then controlling a division of the cooled stream to supply both a cooled recycle stream for anti-surge control and a cooled stream for mixing with the warm compressed gas for temperature control.

U.S. Pat. No. 5,816,286, issued Oct. 6, 1998 to Gary L. Scott et al. for "Pressure Unloading Pilot Operated Regulator Having Pressure Limiting Check Valve," discloses a pressure unloading pilot-operated fluid pressure regulator having a throttling element for controlling fluid flow. A pilot amplifier senses regulator outlet pressure and supplies suitable loading pressure coupled from an inlet supply pressure line through a variable flow restrictor to the throttling element. A check valve has a preset differential pressure defined between the check valve inlet and outlet and is mounted in parallel flow with the flow restrictor to limit the maximum differential pressure across the throttling element to the preset differential pressure of the check valve.

U.S. Pat. No. 5,806,553, issued Sep. 15, 1998 to Herbert R. Sidwell for "Fluid Pressure Control and Relief Apparatus," discloses an apparatus with fluid pressure above a predetermined limit in a fluid pressure system that is reduced by operating a relief valve, having its inlet port connected with the system, in a throttling action. A normally seated valve member is maintained in relief valve closed position by pneumatic pressure on a piston in a chamber of the relief valve. A fluid pressure sensor communicating with the inlet port generates a signal in response to fluid pressure above a predetermined limit received by a sensor signal processor energized by a source of electrical energy, which releases pneumatic pressure in the chamber for a predetermined time interval, allowing system fluid pressure to unseat the valve member and exhaust fluid pressure through the relief valve outlet port.

U.S. Pat. No. 5,391,209, issued Feb. 21, 1995 to Mark J. Pelkey for "Method for Controlling Overpressurization in a Gas Line," discloses a gas pressure safety device used in the natural gas distribution systems leading to homes or other customers. This safety device is connected to a gas-venting device that allows excess gas to exit therefrom. The safety device is made up of a needle valve, a pressure-sensing pilot and a spring-diaphragm actuator. The needle valve is used to restrict the rate of gas flow into the actuator to a rate less than that that can be vented by the pressure-sensing pilot. When an excess pressure is generated in the distribution system, the pressure-sensing pilot senses when to exhaust the excess gas through the actuator and out of the gas-venting device to the atmosphere.

Russian Patent No. SU 767,721, issued Sep. 30, 1980 to Berezhnoj Nikolaj et al. for "Pressure Regulator," discloses an automatic adjusting device and can be used to control pressure or volume in the pipelines for oil and gas industries. The purpose of the invention is to increase reliability of the regulator. This object is achieved by introducing a liquid-filled chamber with a sensor and functional contacts, and gas-filled sealed bellows mounted freely in the chamber. Providing smooth pressure regulation helps to, for example, reduce specific consumption of the active agent in a gas-lift well operation, and the delay in signal transmission increases reliability of the actuating mechanism operation. The pressure regulator includes a chamber completely filled with clean stable liquid, a suspended gas-filled sealed bellows, an adjustable sinker, sensitive element, valves, a pressure gauge, upper functional contacts, lower functional contacts, pipeline, electrical transmission, and actuator. The device operates as follows. In the rest position, the bellows is in an expanded state, and the sensitive element is compressed. The volumetric weight of the bellows with the weight is less than the weight of liquid. Therefore, the bellows floats to the contacts and closes the circuit. At the same time, the electrical member keeps the contacts closed. Any excessive pressure is transmitted through the sensor. At that time the volume of the bellows is decreased according to the Clapeyron-Mendeleev equation. The volumetric weight of the bellow increases and becomes greater than the weight of the liquid, which results in lowering of the bellows into the liquid. The contacts open, while the contacts close. As the result, the transmitter opens the throttle in the actuator. When the pipeline pressure decreases, the process is reversed. The bellows decreases its volumetric weight. When the volumetric weight of the bellows is less than the weight of the liquid the bellows floats. The contacts become open, while the contacts close. The transmitter begins to close the throttle of the actuator.

Chinese Patent No. CN202040548, issued Nov. 11, 2011 to Huang Songli for "Natural Gas Relief Device with Venturi Relief Pipe," discloses a natural gas relief device with a venturi relief pipe comprises a natural gas inlet pipe, a heat exchanger, a venturi relief pipe, a pressure regulator, a filter, a flow meter and a natural gas storage cabinet, wherein the natural gas inlet pipe, the heat exchanger, the venturi relief pipe, the pressure regulator, the filter, the flow meter and the natural gas storage cabinet are connected in series through natural gas pipelines, the heat exchanger is a coil type indirect heat exchanger, an electromagnetic valve is arranged on a heat exchanger outlet pipe, a pressure gauge is arranged on the natural gas pipe at an outlet of the venturi relief pipe, a pressure regulator inlet valve and a pressure regulator outlet valve are arranged on the natural gas pipes at an inlet and an outlet of the pressure regulator respectively, and a gas cabinet inlet valve is arranged on the natural gas pipe in the front of the natural gas storage cabinet. The natural gas relief device has the advantages that 22 MPa inlet pressure and below of compressed natural gas is reduced to 1.2-1.8 MPa by means of the venturi relief pipe, then the gas enters the pressure regulator be subjected to pressure reduction to 0.1-0.4 MPa, and accordingly a pressure regulation system and a heat exchange system are omitted. The natural gas relief device is simple in structure, safe, reliable, convenient to operate, and low in equipment manufacturing cost and operational cost.

Chinese Patent No. CN203630649, issued Jun. 4, 2014, to Chen Yanshan et al. for "Gas Flow or Pressure Adjustment Device," discloses a gas flow or pressure adjustment device. The device comprises a main pipeline and a gas backflow pipeline. An inlet valve, a gas compressor, and an outlet valve are sequentially arranged in the main pipeline. The gas backflow pipeline is provided with an adjusting valve, and connected with the gas compressor in parallel on the main pipeline. According to the gas flow or pressure adjustment device provided by the utility model, the gas backflow pipeline is used for adjusting the air pressure of the main pipeline to keep the air pressure of the main pipeline to be uniform and stable, thereby preventing local overlarge air pressure of the pipeline, and ensuring the transmission safety of the pipeline; besides, the adjusting valve is adopted in the gas backflow pipeline to control the flow of gas, and compared with control valves with precise control components, such as gas flow controllers, gas flow adjusting valves, etc., the adjusting valve has higher adaptability for the gas flowing there through, being suitable for gas transmission applications in a wider range.

SUMMARY OF THE INVENTION

The present invention provides a pipeline-waste-gas reduction method to reduce the amount of gas wasted by existing high-pressure pipelines having existing pipeline controllers and existing actuator-based control valves, by reducing the pressure of gas sent to existing pipeline controllers by a determined factor, consequently reducing the amount of gas wasted by the controllers, and then increasing control pressure returned by the controllers by the same factor, ensuring that the proper control pressure is sent to the existing actuator-based control valves.

The present invention solves an existing problem of too much gas being vented to the atmosphere and wasted by existing pipeline controllers, without requiring replacement or extensive modification of existing pipeline equipment.

BRIEF DESCRIPTION OF DRAWINGS

Reference will now be made to the drawings, wherein like parts are designated by like numerals, and wherein.

DETAILED DESCRIPTION OF THE INVENTION

Figure 1:
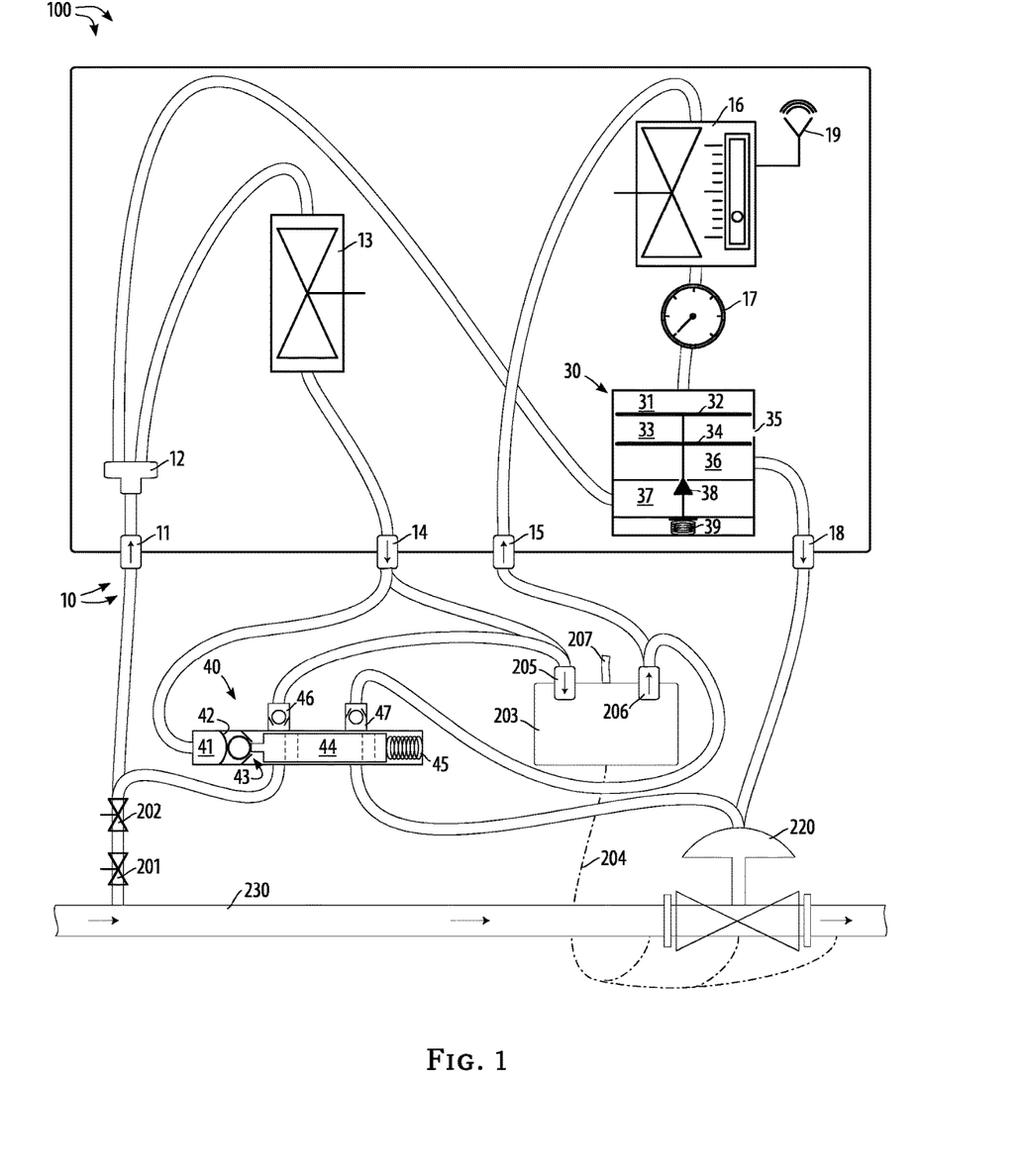
FIG. 1 is a schematic view of the pipeline-waste-gas reduction invention.

Referring to FIG. 1 and all figures generally, the pipeline-waste-gas reduction method 100 and the pipeline-waste-gas reducer apparatus 10 are shown schematically.

There are existing high-pressure pipelines 230 having control valves moved by existing actuators 220 under the control of existing controllers 203 having existing sensors and relays 204 to monitor and control the operation of the pipeline. Gas from the pipeline itself, at reduced pressure, is used as a motive force to operate the actuator 220 to close or partially close the pipeline control valve.

Figure 2:
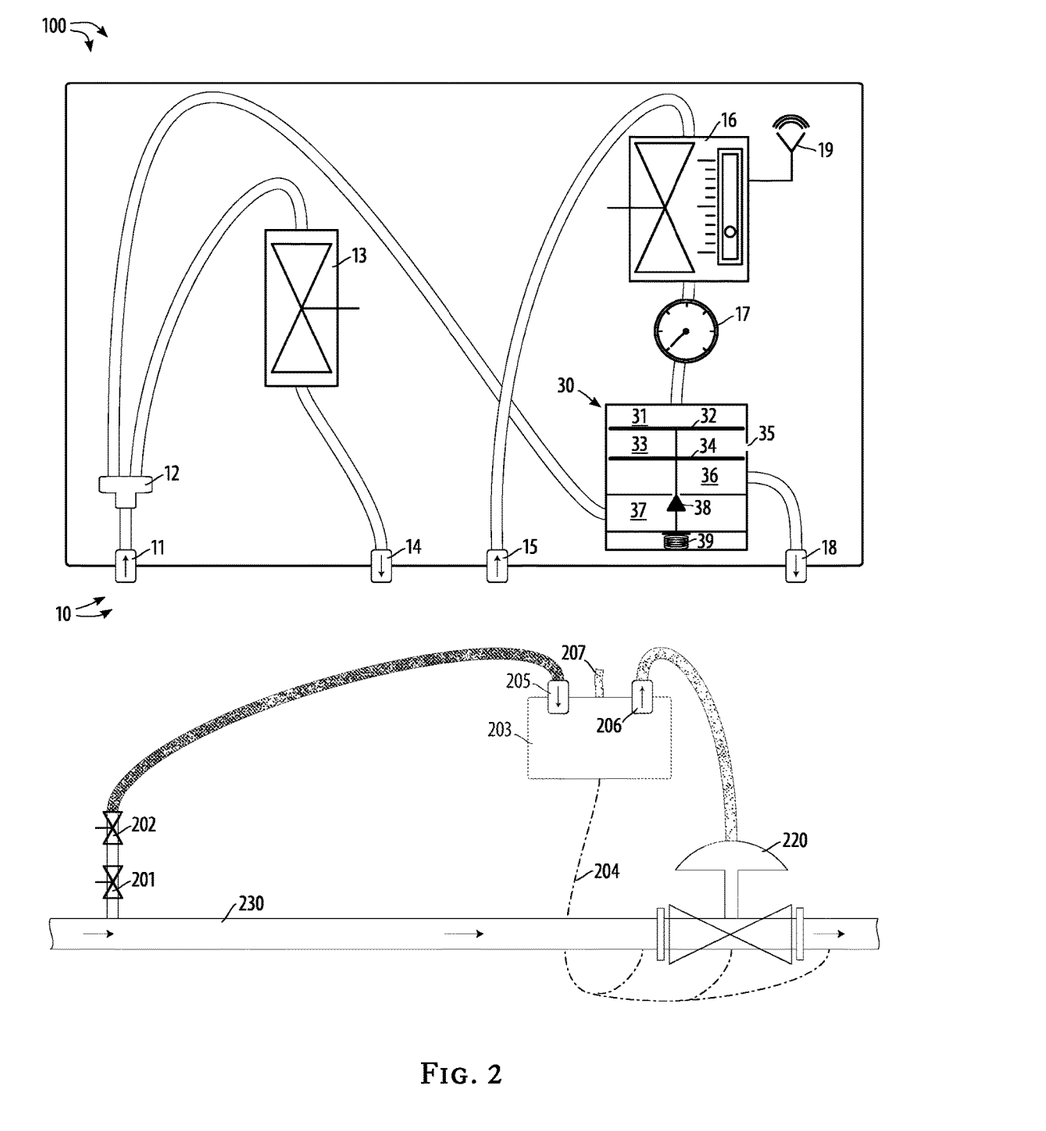
FIG. 2 is a schematic view of the operation of a standard pipeline controller without the pipeline-waste-gas reduction invention engaged.

Referring to FIG. 2, illustrating the standard operation of pipeline control with this invention not engaged, from the high pressure of gas in the pipeline 230, which would typically be about 600 p.s.i., a standard control-level pressure of gas, typically 15 p.s.i., is produced by passage through a high-to-medium regulator 201 and a medium-to-standard regulator 202. The gas at standard control-level pressure is sent to the controller inlet 205. The controller 203, based on information from the pipeline sensors 204, passes a varying pressure ranging from 0 to 100 percent of the pressure at the controller inlet 205 to the controller outlet 206. This pressure sent to the controller outlet is the control pressure which is proportionate to the amount of desired closure of the pipeline control valve by the existing actuator 220. At any given time, any gas being sent to the controller inlet which is not immediately sent to the controller outlet 206 is vented to atmosphere through the waste-gas vent 207.

Except when the controller outlet 206 is sending 100 percent of the controller-inlet pressure, which would completely shut the control valve of the pipeline, the unused percentage of the controller-inlet pressure is vented to the atmosphere through the waste-gas vent 207. Therefore, if the pipeline control valve is desired to be completely open, with no pressure applied by the controller at the controller outlet, then 100 percent of the gas pressure at the controller inlet 205 is vented through the waste-gas vent 207. Using simplified values and discounting pressure losses and other non-linearities for explanation purposes, if the pipeline control valve is desired to be half open and half closed, then the control pressure at the controller outlet 206 will be half of the controller-inlet pressure and the other half will be vented through the waste-gas vent 207. This venting occurs constantly, all of the time that the pipeline control valve is not completely shut.

In existing installations, in the prior art, the control pressure is the entire standard control-level pressure, which is usually 15 p.s.i., and it is applied directly to the existing actuator 220, which requires such a standard control-level pressure, usually 15 p.s.i., to operate and close the pipeline control valve. As a consequence, the entire unused portion of the standard control-level pressure, usually 15 p.s.i., is vented to atmosphere through the waste-gas vent 207.

Figure 3:
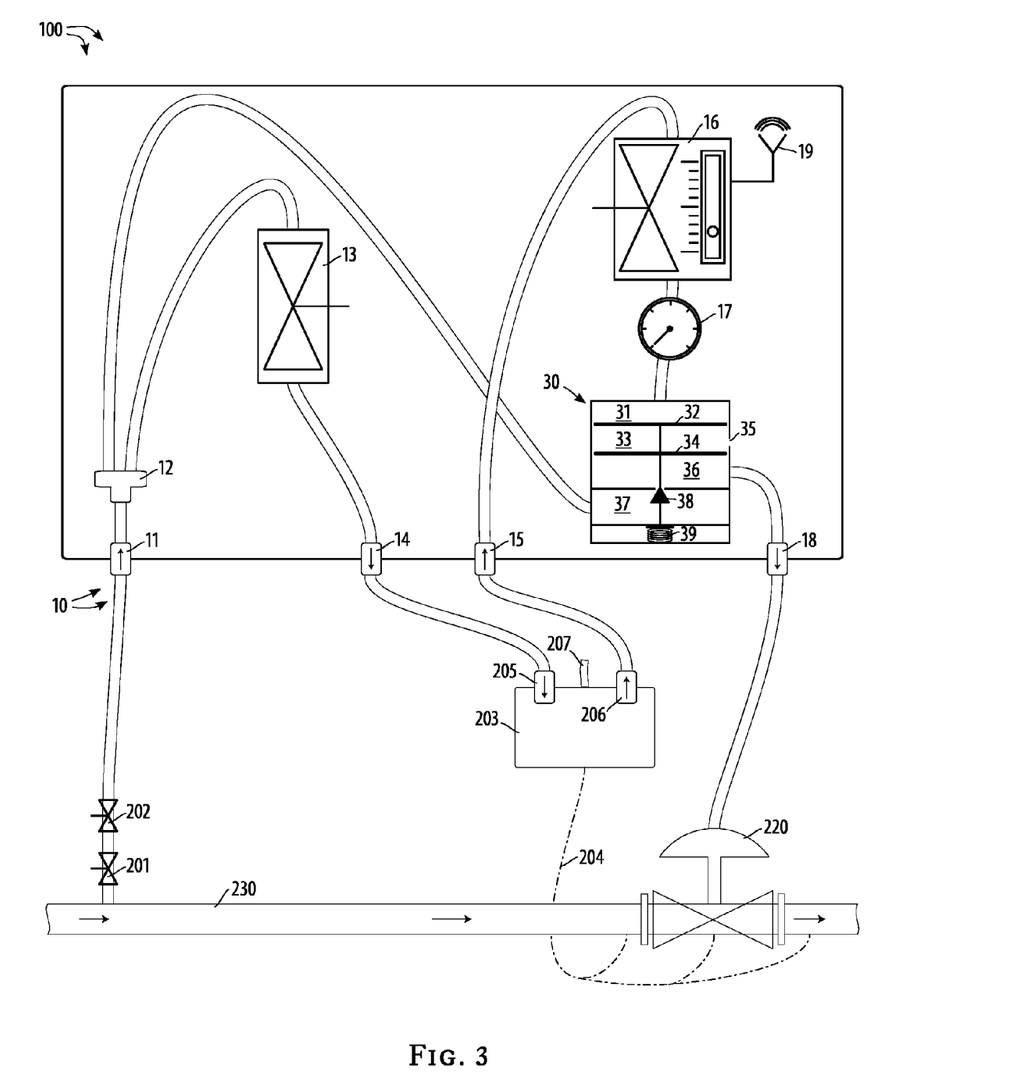
FIG. 3 is a schematic view of an embodiment of the pipeline-waste-gas reduction invention without the fail-safe device provided.

Referring back to FIG. 1, showing an embodiment with a fail-safe device installed, and to FIG. 3, showing an embodiment without a fail-safe device installed, in use, the invention provides a standard-pressure inlet 11 that receives standard control-level gas pressure from the existing pipeline 230 and existing regulators 201, 202. This standard control-level pressure is routed through a splitter 12, which sends the pressure both to the standard-to-special regulator 13 to be decreased by the invention, and also to the special-to-standard multiplier 30 to be used as the motive force for a subsequent increase of the control pressure.

The standard-to-special regulator 13 decreases the standard control-level pressure supplied by the existing pipeline by a determined factor of decrease and increase, yielding a reduced, special control-level gas pressure that is sent through a special-pressure outlet 14 to the existing controller inlet 205. By existing design, the controller's output at the controller outlet 206 is some percentage, from 0 to 100 percent, of the control-level gas pressure at the controller inlet 205, and any of that pressure not applied to the outlet is vented to atmosphere through the waste-gas vent 207. By sending a reduced, special control-level gas pressure to the controller inlet 205, this invention reduces the amount of vented or wasted gas pressure by a factor essentially the same as the factor of decrease and increase used by the standard-to-special regulator 13.

The control pressure, if any, returned from the controller outlet 206 is received into a control-pressure inlet 15. This pressure, although sufficient to serve as a means or medium for signaling through the existing controller 203, will be too weak to move the existing actuator 220, which will have been designed to operate at the higher, standard control-level pressure. Therefore this control pressure received at the control-pressure inlet 15 is sent to a special-to-standard multiplier 30 which increases the pressure by the same factor of decrease and increase used by the standard-to-special regulator 13 to decrease the pressure. A separate line of standard control-level pressure, from the splitter 12, is used as a motive force for the special-to-standard multiplier 30, which will never be required to increase the pressure to any level above the standard control-level gas pressure for which the existing pipeline control system was designed. The increased pressure yielded by the special-to-standard multiplier 30 constitutes a regenerated control pressure, that, after being decreased and increased by the same factor by this invention, will be in the range the existing actuator 220 was designed for.

The regenerated control pressure is sent through the multiplied-to-standard outlet 18 to the existing actuator 220, and the actuator closes or partially closes the pipeline control valve based on the same levels of control pressure for which the existing actuator 220 was designed.

Optionally, a control-pressure flow monitor 16 can be placed after the control-pressure inlet 15 and before the special-to-standard multiplier 30 for the purposes of monitoring, and, if needed, adjusting the control pressure.

Optionally, a control-pressure gauge 17 can be placed between the control-pressure inlet 15 and the special-to-standard multiplier 30 for the purpose of monitoring the control pressure.

Optionally, a means of communication 19 with, for example, an operations center, can be provided for the purposes of remote monitoring and remote adjustments.

Figure 4:
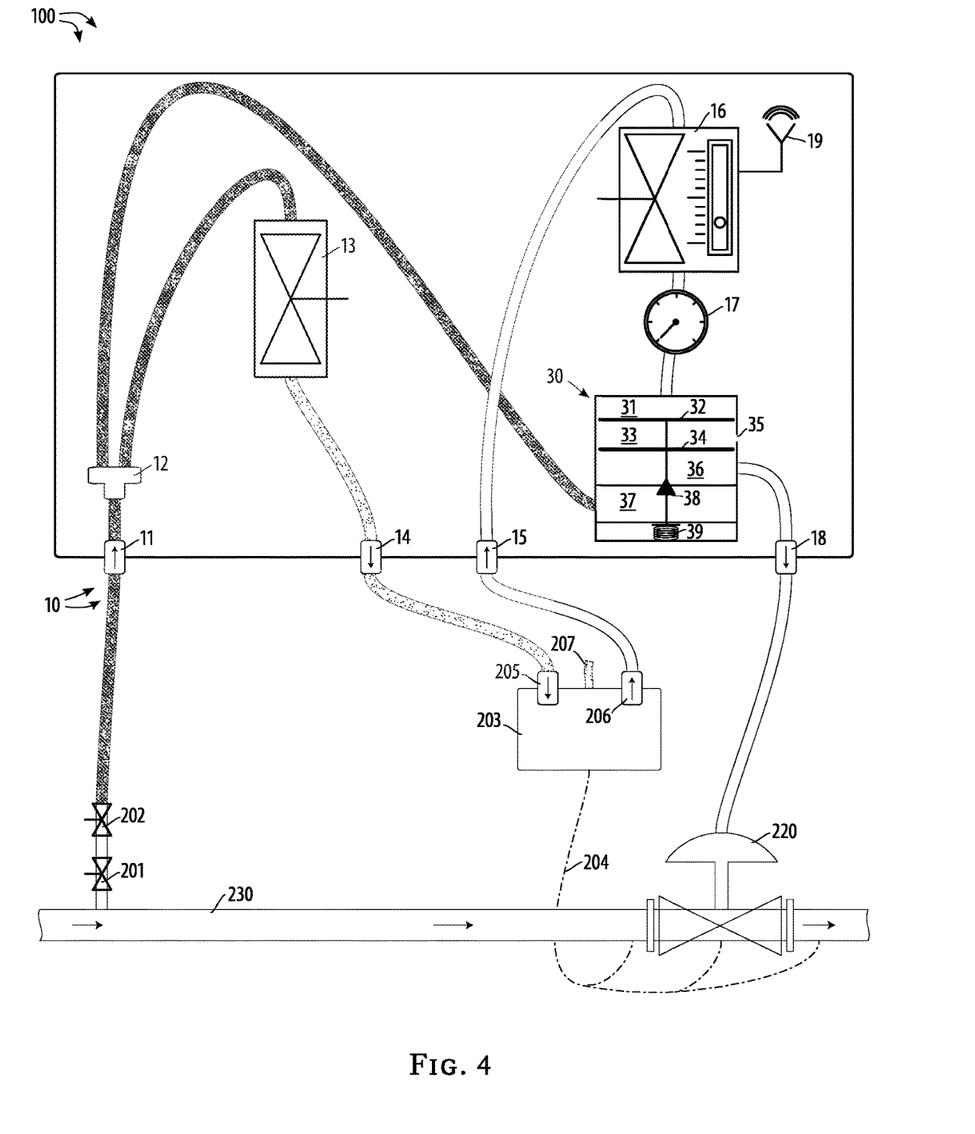
FIG. 4 is a schematic view of the pipeline-waste-gas reduction invention in use, with no pressure sent to the standard actuator.

FIG. 4 illustrates the invention in use, where no closing of the existing actuator 220 is desired, and therefore no control pressure is returned from the controller outlet 206 and no control pressure is sent through the multiplied-to-standard outlet 18.

Figure 5:
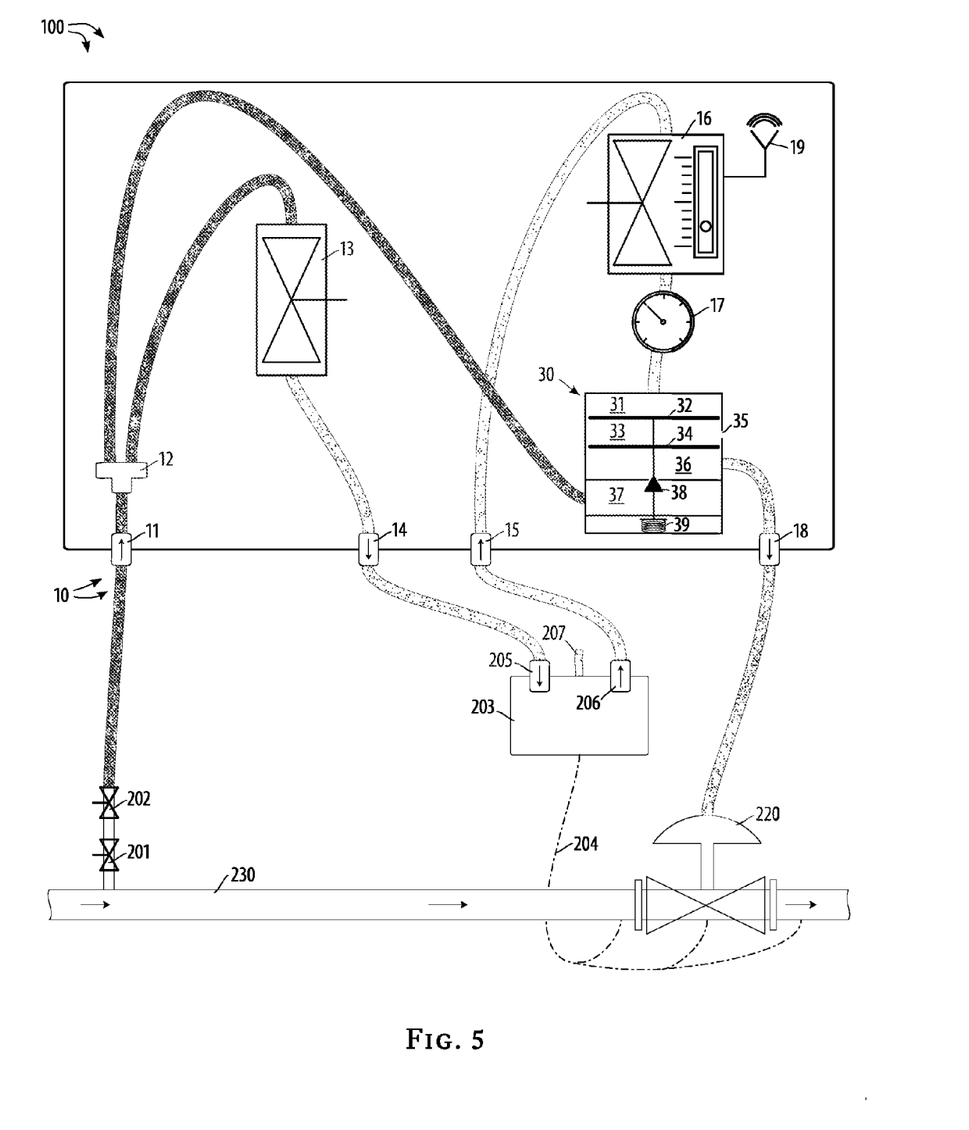
FIG. 5 is a schematic view of the pipeline-waste-gas reduction invention in use, with moderate pressure sent to the standard actuator.

FIG. 5 illustrates the invention in use, where a partial closing of the existing actuator 220 is desired, where the controller outlet 206 returns one-half of the special control-level gas pressure, and where that returned pressure is increased proportionately by the special-to-standard multiplier 30 to a pressure essentially one-half of the standard pressure, and sent through the multiplied-to-standard outlet 18.

Figure 6:
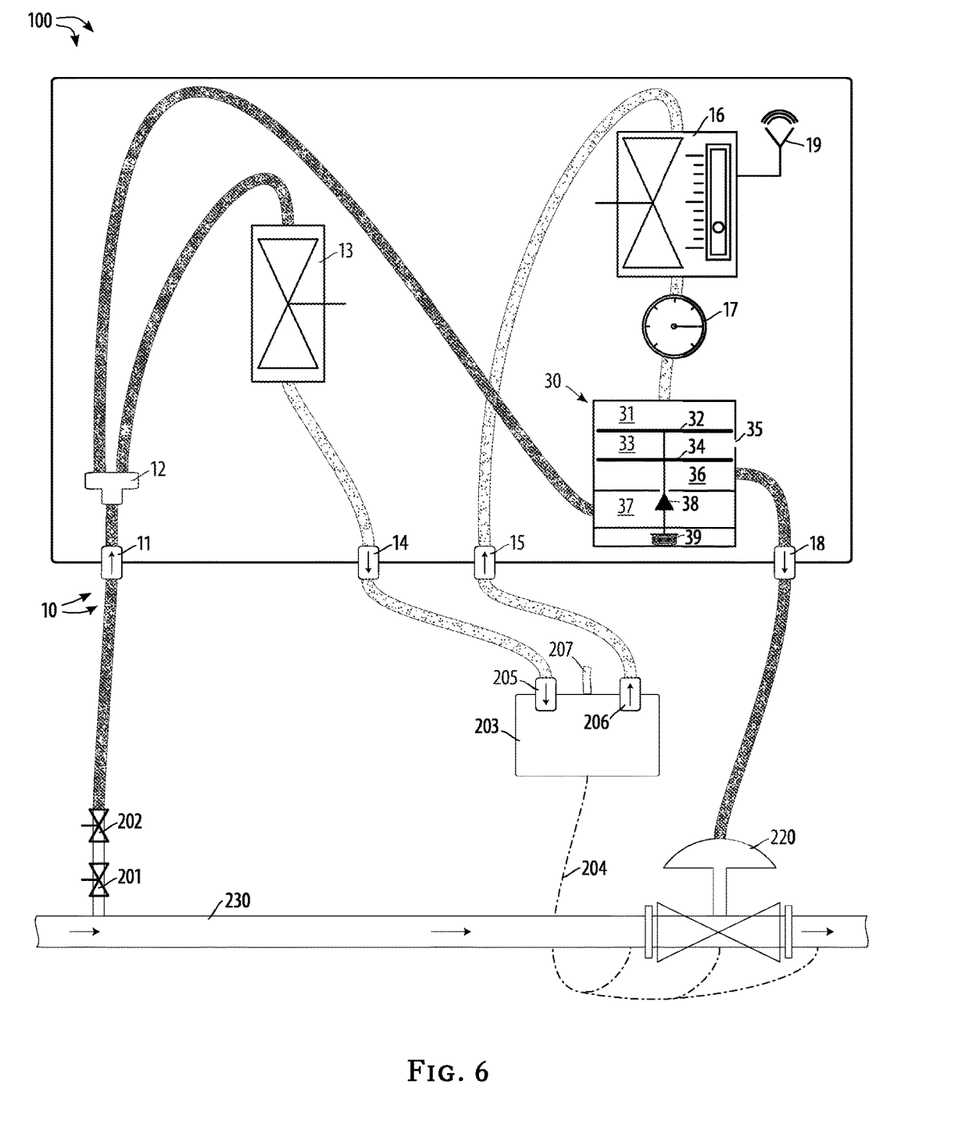
FIG. 6 is a schematic view of the pipeline-waste-gas reduction invention in use, with full pressure sent to the standard actuator.

FIG. 6 illustrates the invention in use, where a total closing of the existing actuator 220 is desired, where the controller outlet 206 returns all of the special control-level gas pressure, and where that returned pressure is increased proportionately by the special-to-standard multiplier 30 to a pressure essentially equal to the standard pressure, and sent through the multiplied-to-standard outlet 18.

In this invention, the standard control-level gas pressure is reduced by a determined factor of decrease and increase to provide a special control-level gas pressure that is sent to the existing controller inlet 205, after which the proportionate control pressure received from the controller outlet 206 is increased by the same factor and then sent as a regenerated control pressure to the existing actuator. For example, the standard control-level pressure is 15 p.s.i, and the full 15 p.s.i. is required to make the existing actuator 220 fully close the pipeline control valve. Under the prior art, the full 15 p.s.i. or some percentage will be constantly vented to atmosphere through the waste-gas vent 207. But with this invention, a reduced pressure of gas is sent to the controller and consequently wasted, while a full, regenerated pressure of gas is sent to the actuator to provide the motive force for closing or partially closing the control valve.

In a preferred embodiment adapted to the common standard control-level pressure of 15 p.s.i., this invention receives the standard control-level pressure of 15 p.s.i. and decreases that pressure by a factor of 3 and sends the resulting special control-level pressure of 5 p.s.i. to the existing controller, which sends back a control pressure varying between 0 and 5 p.s.i., which is increased by a factor of 3 by this invention, which brings the pressure sent to the actuator back up to the range of between 0 and 15 p.s.i., proportionally. With this embodiment of the invention, only a maximum of 5 p.s.i. or some percentage will be constantly vented to atmosphere through the waste-gas vent 207. There is no opportunity for the full 15 p.s.i. of control-level pressure supplied from the pipeline to be wasted. Only the special control-level gas pressure of 5 p.s.i. is subject to waste, setting a ceiling of possible wasted natural gas at 5 p.s.i. instead of 15 p.s.i.

The factor of decrease of wasted natural gas vented to the atmosphere is essentially the same as the factor of decrease and increase of the control-level pressure. Non-linear and less-efficient behavior of the existing systems at very low pressures, and the variability of environmental and mechanical conditions encountered in the field, sets a practical lower limit on how low, in absolute terms, the special control-level pressure can be set. While special control-level pressures of significantly less than 5 p.s.i. might be effective some of the time, there is reason to be cautious about operating at such low pressures. The existing controllers 203 are subject to hysteresis and other non-linearities when operating at very low pressures. Prototypes of the present invention have shown that 5 p.s.i. is a satisfactory, safe, and effective absolute special control-level pressure.

Determination of the factor for decrease and increase of control-level gas pressure is limited on the high end by the constraint of avoiding dropping the control-level pressure, in absolute terms, to much below 5 p.s.i. Therefore given an existing standard control-level gas pressure of 15 p.s.i., then a factor of 3, and a special control-level gas pressure of 5 p.s.i., are a reasonable upper limit, yielding a 3-fold reduction of wasted gas from 15 p.s.i. down to 5 p.s.i. But given an existing standard control-level gas pressure of 30 p.s.i., then a factor for decrease and increase of 6 yields the same special control-level gas pressure of 5 p.s.i. in absolute terms, but yields a 6-fold reduction of wasted gas from 30 p.s.i. down to 5 p.s.i.

The operation of the special-to-standard multiplier 30 will now be described in more detail. In operation, the control pressure sent from the controller outlet 206 and received into the control-pressure inlet 15 is a percentage of the reduced, special control-level gas pressure that was sent through the special-pressure outlet 14 to the existing controller inlet 205. The reduced, special pressure was obtained by decreasing the standard pressure by a determined factor of decrease and increase. The special-to-standard multiplier 30 is supplied with gas at standard pressure from the splitter 12, and allows a percentage of this standard pressure to be sent to the multiplied-to-standard outlet 18 according to the percentage of the special pressure that is returned from the controller outlet 206. In effect, the special-to-standard multiplier 30 increases the gas pressure sent to the multiplied-to-standard outlet 18 by the same factor of decrease and increase by which the standard pressure was reduced to create the special pressure.

In operation of the special-to-standard multiplier 30, the control pressure received at the control-pressure inlet 15 enters a sealed first chamber 31 and acts upon a first diaphragm 32 which is attached to and drives a seat needle valve 38 against calibrated opposing force from a spring 39. The percentage deflection of the first diaphragm and the percentage opening of the seat needle valve 38 are calibrated to allow a corresponding portion of gas at standard pressure, supplied to a standard-pressure-supply chamber 37 from the splitter 12, to enter through the seat needle valve 38 into the standard-pressure-delivery chamber 36, from where it is sent to the multiplied-to-standard outlet 18 and to the existing actuator 220. A vented second chamber 33, having a second diaphragm 34 and a vent 35, absorbs any back pressure and ensures that the first diaphragm 32 is operating only against the calibrated force of the spring 39 because the vented second chamber 33 is always at atmospheric pressure.

Optionally, a fail-safe device 40 can be provided to insure the existing controller 203 will be supplied with standard control-level gas pressure at the controller inlet 205, and the existing actuator 220 will be supplied with standard-level control pressure from the controller outlet 206, in the event of any loss or absence of a special control-level gas pressure at the special-pressure outlet 14.

Figure 7:
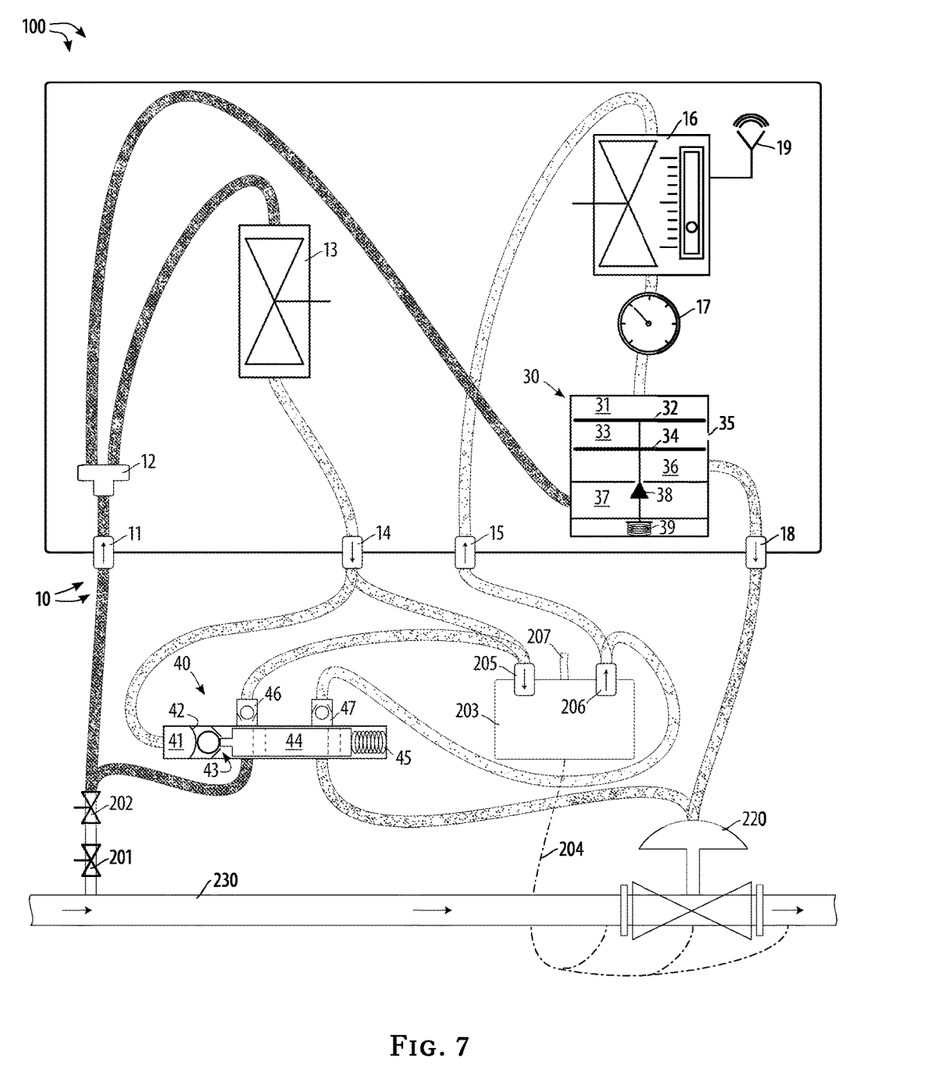
FIG. 7 is a schematic view of an embodiment of the pipeline-waste-gas reduction invention having the fail-safe device provided, operating normally.

Referring to FIG. 7, in operation of the fail-safe device 40 in non-failure mode, the special-pressure chamber 41 is at equal pressure with the special-pressure outlet 14 and acts upon a special-pressure diaphragm 42 that drives a valve 43 and a gate 44 against the calibrated pressure of a spring 45. The spring 45 is calibrated to exert at least 1 p.s.i., and less than 4 p.s.i. Two passageways, a to-controller passageway 46 and a from-controller passageway 47 are provided, each running through the fail-safe device in such a way that they can be both blocked, or both unblocked, by the positioning of the open and closed gateways of the gate 45. When a sufficient positive pressure is present in the special-pressure chamber 41, the diaphragm 42 moves the valve 43 and gate 44, compressing the spring 45. In this position, the gate 44 presents a solid, blocking surface or closed gateways to both passageways 46, 47 and no gas pressure moves through the fail-safe device. In this position, the pipeline-waste-gas reduction invention performs normally.

Figure 8:
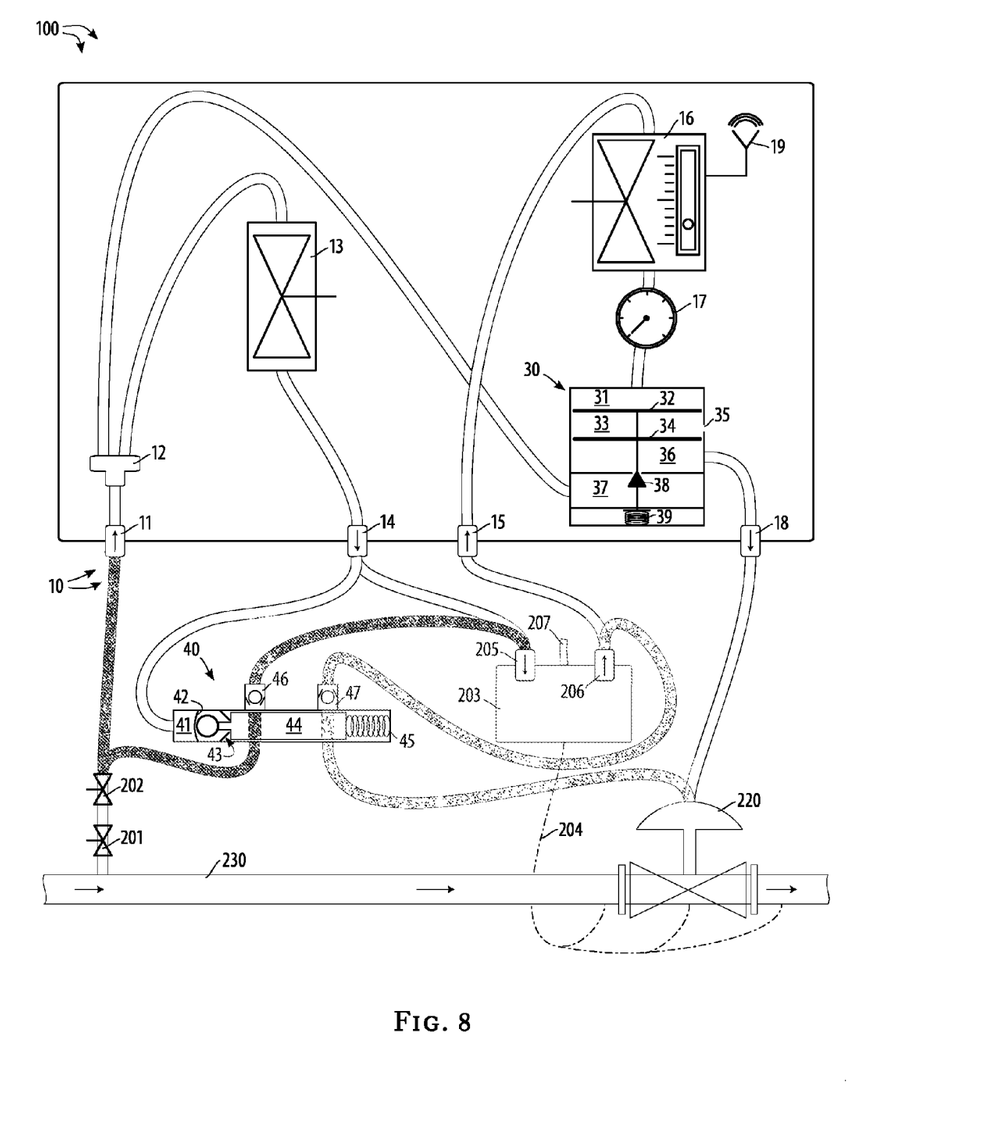
FIG. 8 is a schematic view of an embodiment of the pipeline-waste-gas reduction invention having the fail-safe device provided, operating in failure mode.

Referring to FIG. 8, in operation of the fail-safe device 40 in failure mode, the special-pressure chamber 41 is at equal pressure with the special-pressure outlet 14, which is zero because of some obstruction or other failure. Therefore the special-pressure diaphragm 42 does not drive the valve 43 and the gate 44 against the pressure of a spring 45. In this position, the gate 44 presents open gateways to both passageways 46, 47 and gas pressure moves through the fail-safe device. The to-controller passageway 46 sends standard control-level gas pressure from the existing pipeline 230 and regulators 201, 202 straight to the existing controller inlet 205. The from-controller passageway 47 sends control pressure from the existing controller outlet 206 straight to the existing actuator 220. In this position, the pipeline-waste-gas reduction invention is bypassed, and the existing controller 203 and the existing actuator 220 perform using standard control-level gas pressure.

Many changes and modifications can be made in the present invention without departing from the spirit thereof. I therefore pray that my rights to the present invention be limited only by the scope of the appended claims.

We claim:

1. A pipeline-waste-gas reduction method for reducing wasted gas in an existing pipeline, pipeline controller, and pipeline control valve, with actuator which uses a standard control-level pressure of gas which is vented to atmosphere after use, the pipeline-waste-gas reduction method comprising:
  (i) providing a standard-pressure inlet adapted to accept a standard control-level pressure from the existing pipeline;
  (ii) providing a splitter adapted to divide the standard control-level pressure accepted by said standard-pressure inlet;
  (iii) providing a standard-to-special regulator adapted to accept standard control-level pressure from said splitter and decrease that pressure by a factor of decrease and increase, yielding a special control-level pressure;
  (iv) providing a special-pressure outlet adapted to send said special control-level pressure to the existing pipeline controller;
  (v) providing a control-pressure inlet adapted to accept control pressure from the existing pipeline controller;
  (vi) providing a special-to-standard multiplier adapted to accept standard control-level pressure from said splitter for motive power and adapted to accept control pressure from said control-pressure inlet and increase the control pressure by said factor of decrease and increase, yielding a regenerated control pressure;
  (vii) providing a multiplied-to-standard outlet adapted to send regenerated control pressure to the existing control-valve actuator,
  where consequently the amount of waste gas the existing pipeline controller vents to atmosphere is limited to said special control-level pressure instead of the standard control-level pressure, yielding a reduction of wasted gas by an amount essentially equal to said factor of decrease and increase; and
  (viii) providing a fail-safe device comprising:
    (a) a special-pressure chamber at equal pressure with said special-pressure outlet;
    (b) a special-pressure diaphragm driven by the pressure in said special-pressure chamber;
    (c) a valve driven by said special-pressure diaphragm;
    (d) a gate adapted to provide two open gateways or two closed gateways through a change of position, driven by said valve, a spring adapted to apply calibrated pressure in opposition to the movement of said special-pressure diaphragm;
    (e) a to-controller passageway adapted to allow passage of control-level gas pressure from the existing pipeline to the existing controller inlet; and
    (f) a from-controller passageway adapted to allow passage of control gas pressure from the existing controller outlet to the existing actuator;
  where sufficient positive pressure in said special-pressure chamber moves said diaphragm, valve, and gate against the calibrated pressure of said spring, positioning said gate with both closed gateways blocking both said passageways, thereby allowing normal operation;
  and where absence of sufficient positive pressure in said special-pressure chamber fails to move said special-pressure diaphragm, valve, and gate against the calibrated pressure of said spring, positioning said gate with both open gateways opening both said passageways, thereby bypassing all other components of said pipeline-waste-gas reducer.

* * * * *